United States Patent [19]

Trewitt et al.

[11] Patent Number: 6,134,531
[45] Date of Patent: *Oct. 17, 2000

[54] METHOD AND APPARATUS FOR CORRELATING REAL-TIME AUDIENCE FEEDBACK WITH SEGMENTS OF BROADCAST PROGRAMS

[75] Inventors: Glenn Trewitt, Sunnyvale; David R. Jefferson, Pleasant Hill; Raymond Paul Stata, Palo Alto; Edward M. Gould, Martinez, all of Calif.

[73] Assignee: Digital Equipment Corporation, Maynard, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,333

[22] Filed: Sep. 24, 1997

[51] Int. Cl.[7] ................................ G06F 19/00
[52] U.S. Cl. ................................ 705/10; 705/1
[58] Field of Search .................. 705/10, 1, 27; 345/327; 370/252, 312

[56] References Cited

U.S. PATENT DOCUMENTS

| | | | |
|---|---|---|---|
| 5,036,389 | 7/1991 | Morales | 348/13 |
| 5,226,177 | 7/1993 | Nickerson | 455/2 |
| 5,600,632 | 2/1997 | Schulman | 370/252 |
| 5,633,872 | 5/1997 | Dinkins | 370/312 |
| 5,703,795 | 12/1997 | Mankovitz | 345/327 |
| 5,715,400 | 2/1998 | Reimer et al. | 705/27 |
| 5,761,606 | 6/1998 | Wolzien | 455/6.2 |
| 5,812,642 | 9/1998 | Leroy | 379/92.01 |
| 5,861,881 | 1/1999 | Freeman et al. | 345/302 |

OTHER PUBLICATIONS

McLoone, Sharon "Interactive Couch Potatoes?" Information & Interactive Services Report vol. 17 issue 8 retrieved from Dialog file #696, Mar. 29, 1996.

"Joining Television and The Internet Using JAVA" Internet Week vol. 2 issue 14 retrieved from Dialog file #696, Apr. 1, 1996.

"New ACTV hypes its path to Internet–TV convergence" Electronic Media vol. 15 n 28 p 12 retrieved from Dialog file #9, Jul. 8, 1996.

Ubios, Jeff "Utopia or oblivion: Intel's Intercast" Digital Media v6, n3, p11, Sep. 1996.

Coetanian Systems Time Synchronization Javascript Version 7.1a http://www.coetnian.com, Apr. 1997.

WebTV Plus web page http://developer.webtv.net/docs/ITV/ITV.html, Nov. 1998.

AboutTime Home Page http/arachnoid.com/abouttime/index.html, Oct. 1998.

Haidl, Mark "Time Services" http//leroy.cc.uregina.ca/~netwrok/technotes/504/cctn504–0.html, Jun. 1996.

*Primary Examiner*—Eric W. Stamber
*Assistant Examiner*—Penny Caudle
*Attorney, Agent, or Firm*—Pennie & Edmonds LLP

[57] ABSTRACT

A computerized method enables an audience to synchronously interact with a broadcast program in realtime. A broadcast clock of a broadcast system is synchronized to a standard time. A server clock of a server computer is synchronized to the standard time using a network timing protocol. A client computer clock of a client computer is synchronized to the server clock. The program is broadcast synchronously to the broadcast clock. Web pages are provided by the server computer to the client computer. Responses generated by the client computer are time-stamped according to the synchronized time of the client computer so that the responses can be time-correlated to segments of the program.

5 Claims, 7 Drawing Sheets

METHOD AND APPARATUS FOR CORRELATING REAL-TIME AUDIENCE FEEDBACK WITH SEGMENTS OF BROADCAST PROGRAMS

FIELD OF THE INVENTION

This invention relates generally to capturing audience interactions to broadcast programs, and more particular to capturing synchronized audience interactions.

BACKGROUND OF THE INVENTION

In the broadcast and entertainment industry, audiences are frequently asked to interact with a broadcast program so that their reaction to specific content can be gauged. The program may be entertainment or advertising where the producer is trying to measure or tune the program's popular appeal. The program can be a live political debate. In this case, the reaction of the audience can provide an instantaneous poll.

The program may be an interactive television program where the audience's reaction can become an element of the program itself. For example, during a broadcast of a sporting event, the announcer could indicate the level of audience support for the competing teams. Alternatively, the reaction of the audience could be used to control the outcome of the program, i.e., the audience determines the outcome of the story being broadcast.

In the past, focus groups have been used to capture people's reaction to programs. There, the members of the group are assembled in a room, and the group is observed as it reacts to the program as naturally as possible under the circumstances. Usually the members of the focus group are interviewed, individually or collectively, afterward to validate the observations.

This approach only works for a limited size of audience, and the members of the focus group must live within a reasonable distance of the focus group site. Focus groups are usually not held in people's homes, so some kind of reward must be given to induce people to participate. In addition, it takes effort to organize and structure focus groups, which makes focus groups unsuitable for many spontaneous real-time interactions of "live" broadcast programs. In addition, the results obtained can be severely skewed by the way that the small number of focus group members are selected.

Telephone polling is sometimes able to capture some aspects of audience reaction, but this method also has built-in limitations. A poll typically asks audience members to recall their reactions hours or days after the fact; it does not capture reactions while the program is happening, thereby introducing complex biases of which pollsters are aware, but for which they cannot compensate. Polling tends to be expensive, so it is only rarely feasible to poll thousands of people. And of course, polling is not a real-time technique.

It is also possible to attempt to capture audience reactions using other communications methods, such as requesting electronic mail from the audience. However, such methods have other limitations. If the responses are in prose, then human intervention is required to interpret the responses. This dramatically limits the size of the audience that can be handled.

Therefore, it is desired to provide a method and apparatus which would allow an audience to interact with a program independent of the audience's geographical distribution and size. It should also be possible to gather reactions from the members of the audience to the program without cooperation of the broadcaster. Furthermore, it should be possible to accurately correlate reactions to specific segments of the program so that variations of the reactions over time can be taken into consideration.

SUMMARY OF THE INVENTION

A computerized method is provided for enabling an audience to interact with a broadcast program. A broadcast clock of a broadcast system is synchronized to a standard time, and a server clock of a server computer is synchronized to the standard time. A client clock of a client computer is synchronized to the server clock using repeated requests and replies via the Internet.

The program is broadcast to the audience synchronous with the broadcast clock, concurrently the client computer accesses Web pages provided by the server computer. Members of the audience generate responses to the broadcast program using the client computer. The responses are time-stamped with adjusted time values so the responses can be directly correlated to segments of the broadcast program.

DETAILED DESCRIPTION OF PREFERRED EMBODIMENTS

Figure 1:
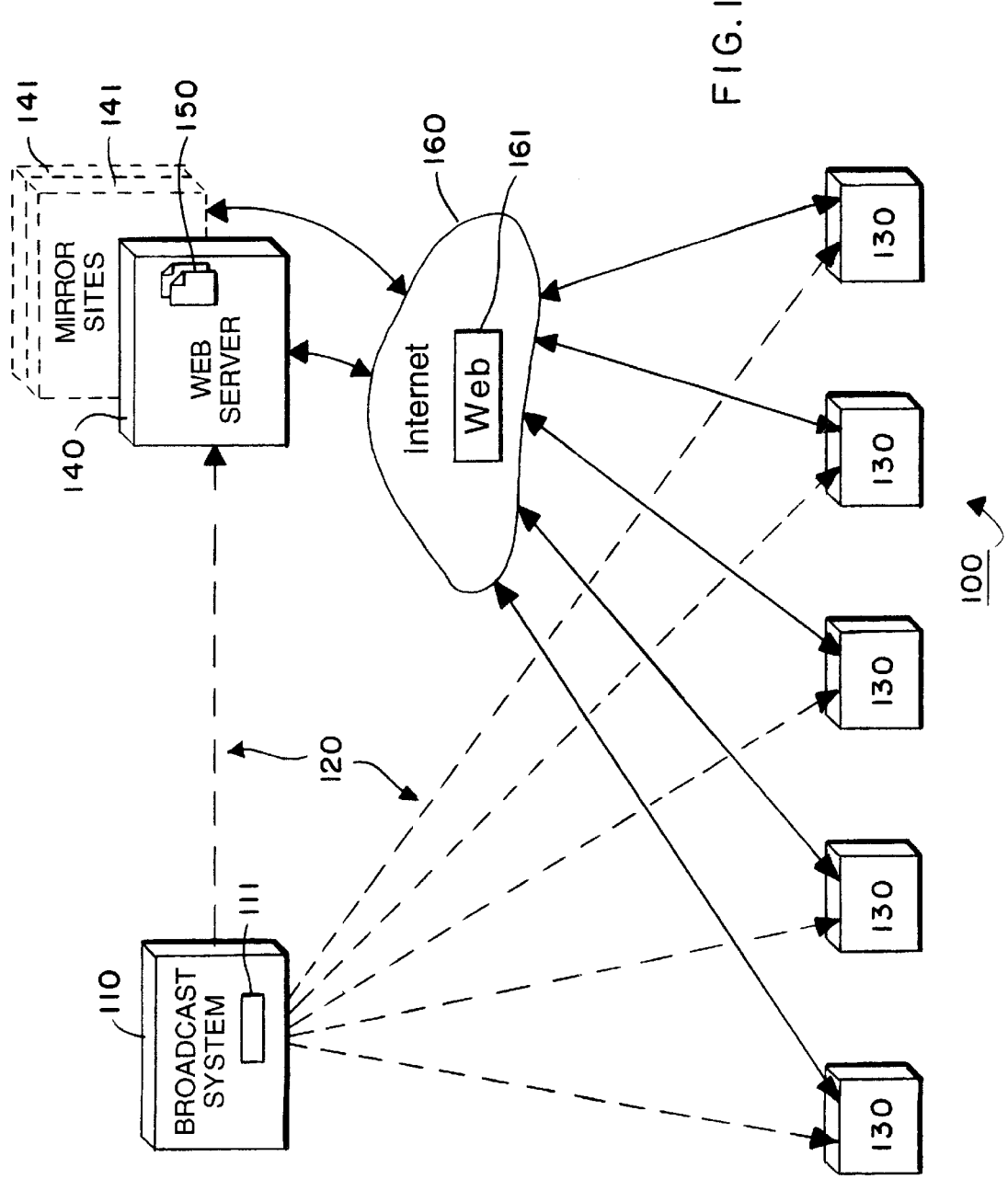
FIG. 1 is a block diagram of an arrangement allowing audience interaction with a broadcast program according to the invention.

FIG. 1 shows an arrangement 100 which enables an audience 130 to interact with a broadcast program 111 according to the invention. A broadcaster system 110 broadcasts a radio or television program 111 via some broadcast medium 120 to the audience 130. The program 111 can be text, audio, video, or other multi-media content. The broadcast system 110 can use any broadcast medium, e.g., radio, terrestrial or satellite television, cable, webcasting, and the like. Each person in the audience 130 views or hears the broadcast program 111.

Concurrently, one or more server computers 140 maintain information related to the broadcast program 111 on Web or "mirror" sites 141. The server computer 140 may or may not be operated by the same organization doing the broadcasting. In fact, the server computers 140 can operate totally independent of the broadcast system 110. The server computer 140 can also monitor the broadcast to update the information of the site appropriately, although this is not required.

The audience 130 can access and interact with the information via client computers connected to the server computers 140 via the Internet 160 while the program 111 is consumed. Part of the Internet 160 includes an application level interface known as the World-Wide-Web (Web) 161. Therefore, the server computers are commonly known as Web servers, and the related information of the Web sites 141 is preferably in the form of Hyper Text Markup Language (HTML) pages 150, e.g., Web pages. A collection of related Web pages comprise the "site." The exact configurations of the equipment used by the audience 130 can be numerous, as described below.

Figure 2:
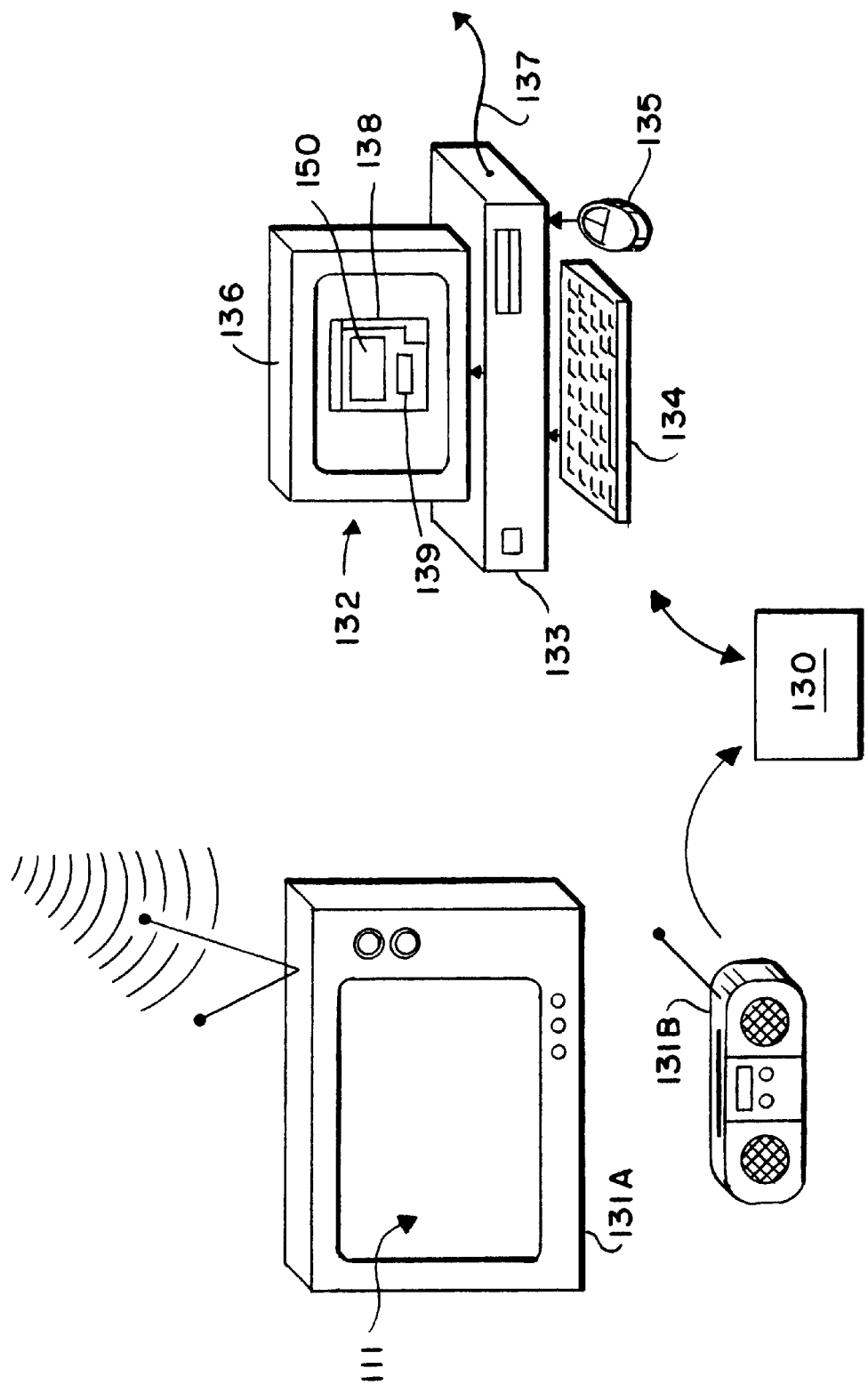
FIG. 2 is a block diagram of a broadcast program receiver and a networked personal computer for allowing audience interaction.

As shown in FIG. 2, a particular member of the audience 130 can monitor the program 111 on a broadcast receiver, for example, a television 131A or a radio 131B. The client computer 132 can be in the form of a lap-top, personal computer, workstation, or the like. A typical client personal computer 132 includes a processor box 133. The client computer 132 is usually connected to input and output (I/O) devices. Input devices can be a keyboard 134 and a mouse 135, the primary output device is usually a monitor 136. The client computer 132 also has a two-way connection 137 to the Internet 160 of FIG. 1, perhaps using a modem and a local Internet Service Provider (ISP).

The client computer 132 executes operating system software, for example, Microsoft Windows or Unix, and application software. One application software program is a Web browser 138, for example, the Netscape Navigator, or the Microsoft Internet Explorer. The browser 138 is capable of "downloading" and interacting with the Web pages 150 of the Web server sites via the Internet 160. The pages 150 can have associated executable "applet" programs 139 which can also be downloaded and executed by the client via the browser.

When a particular Web page 150 is downloaded, the audience may at any time send information back to the Web site via the Internet 160 of FIG. 1, for example by clicking on a button in the browser window using the mouse 135, or by filling out and sending a form using the keyboard 134. If sufficient bandwidth and server power are available, then the audience members may from time to time send an audio message back to the web site, or a video message, or even a continuous audio-video stream, or indeed any kind of data at all. In any of these cases, the Web server 140 may also send occasional data, or a stream of data, back to the audience members, perhaps as feedback or as a reward.

Figure 3:
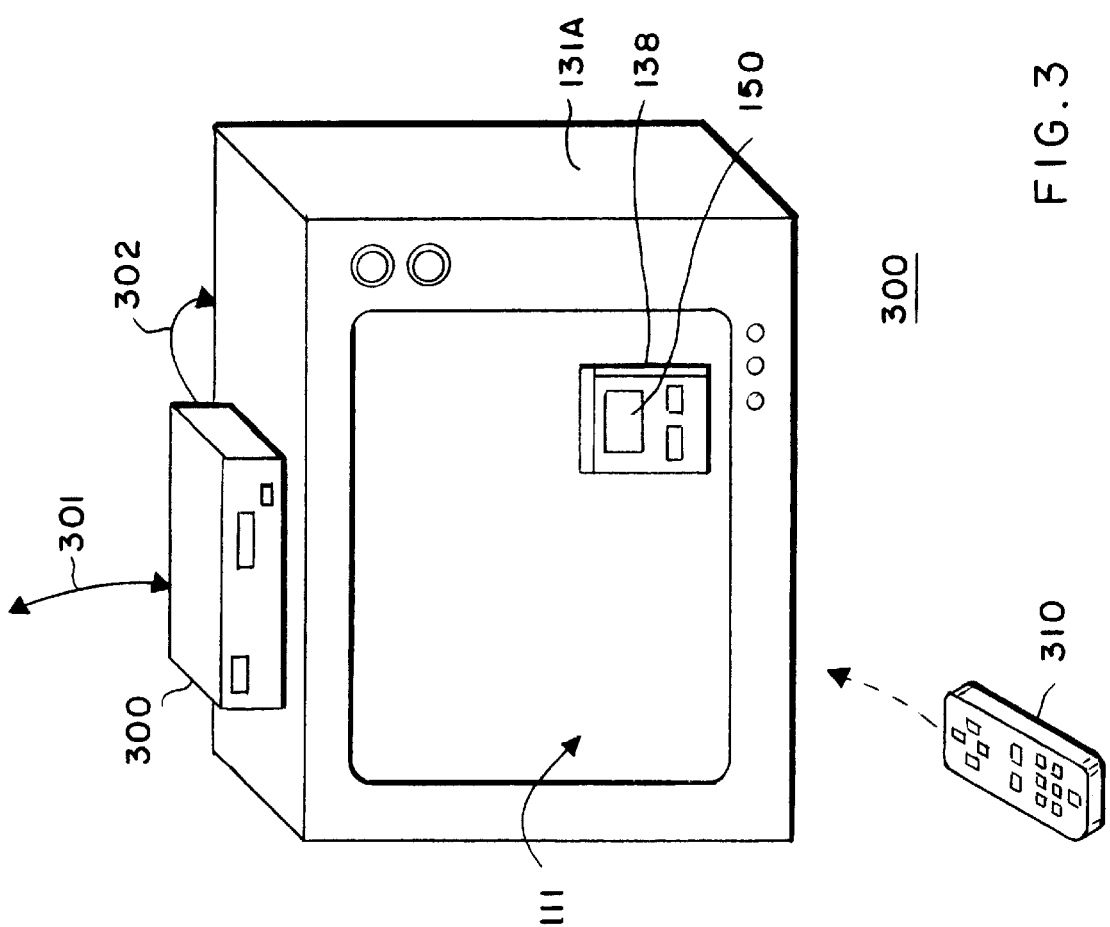
FIG. 3 is a block diagram of a television equipped with a set-top box.

FIG. 3 shows an alternative arrangement 300. Here, the television 131A is augmented with a set-top box 300. The set-top box 300 has a connection 301 with the Internet 160, perhaps by a cable. The set-top box 300 also has a video output 302 to the television 131A. The set-top box 300 allows the audience member to interact with the browser 138 and the pages 150 displayed on the same screen as the television program 111 using a remote controller 310.

Figure 4:
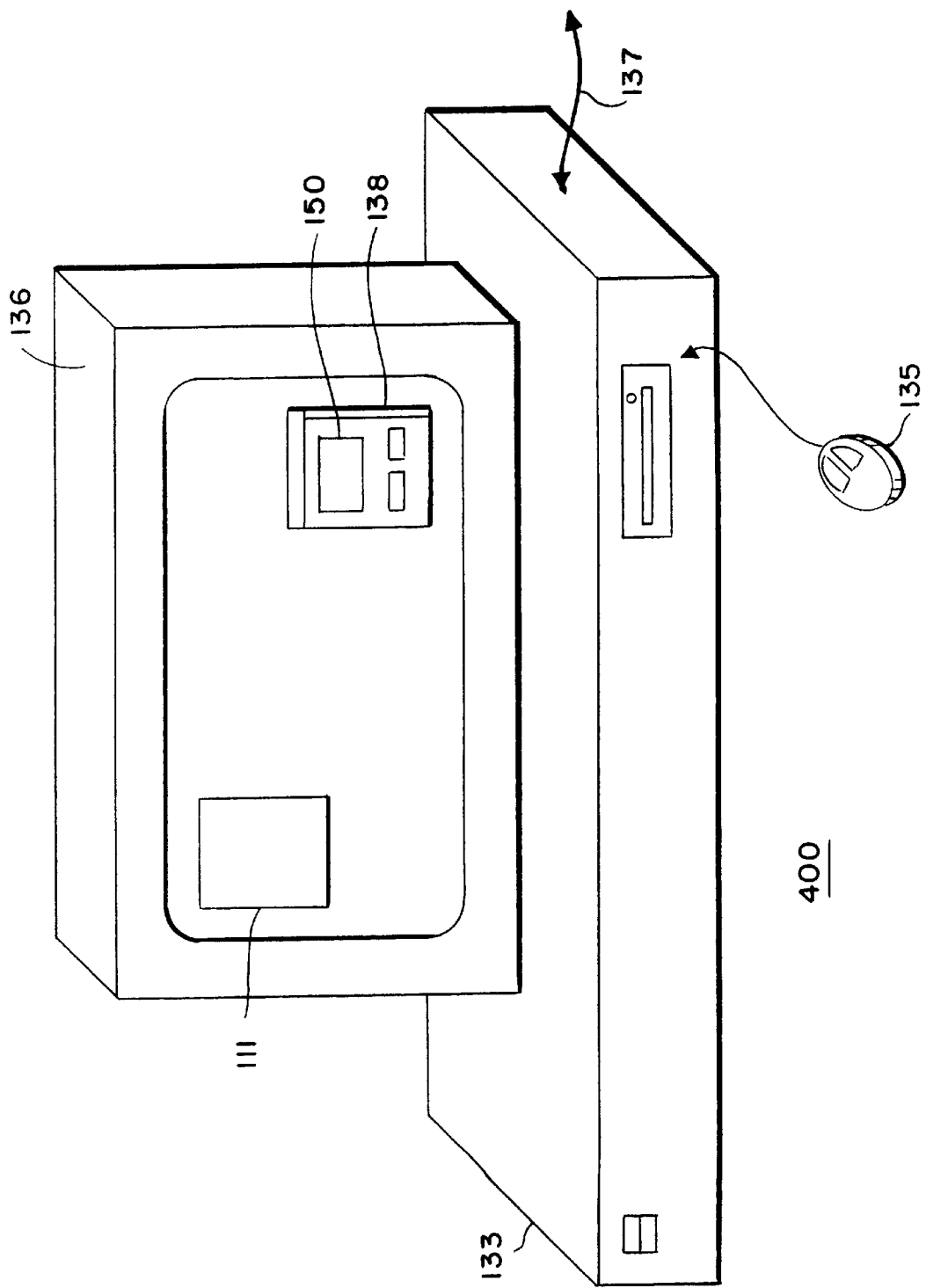
FIG. 4 is a diagram of a client computer with a window to display a broadcast program.

FIG. 4 shows an arrangement 400 where the audience member views the program 111 on the same monitor 136 as is used for displaying the browser 138. In this variation, the processor box 133 is equipped with a tuner configured to receive television signals via the connection 137, or through the air.

Figure 5:
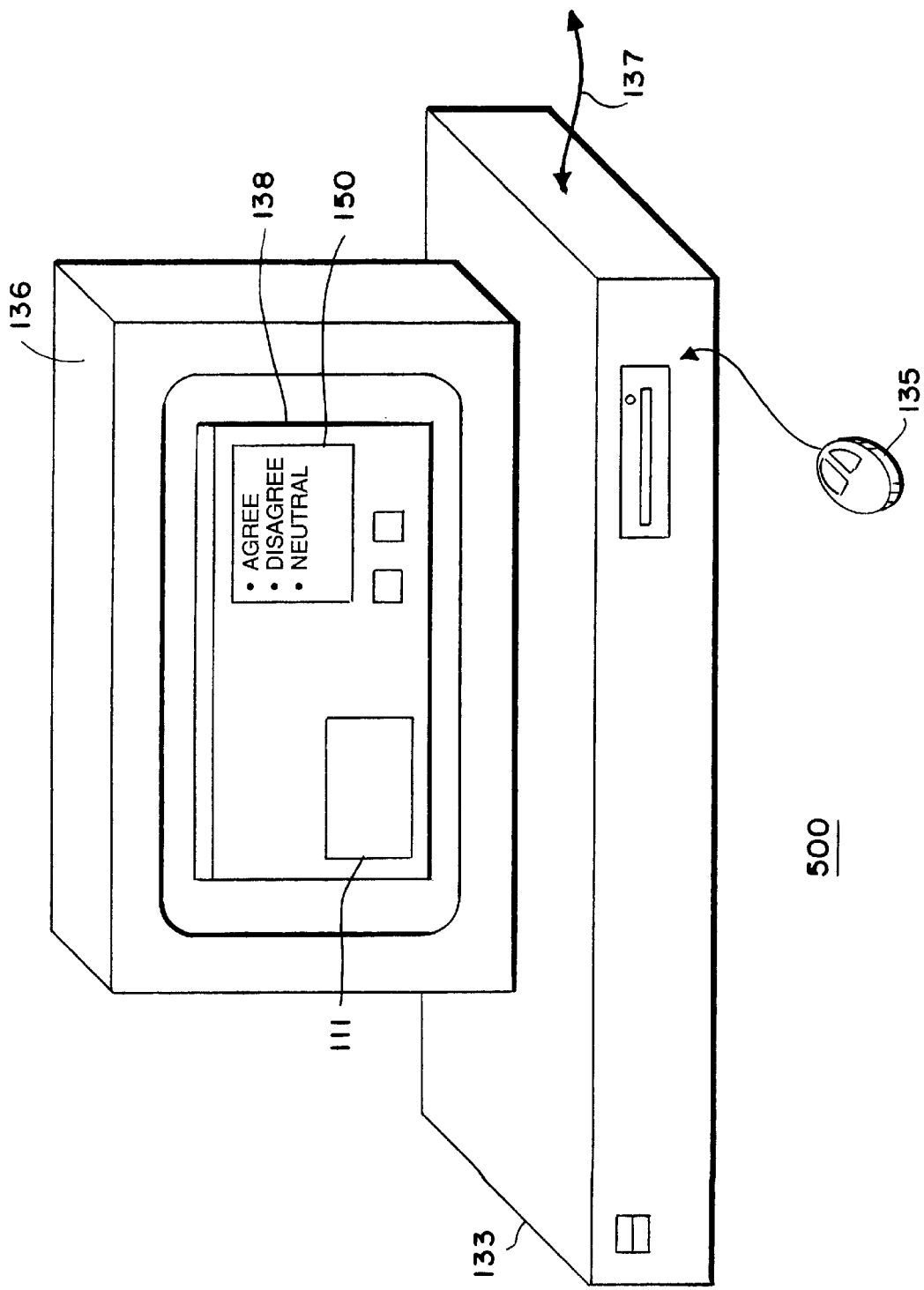
FIG. 5 is a diagram of a program displayed within a window of a Web browser.

In the arrangement 500 of FIG. 5, both the program 111 and the Web pages 150 are displayed within "windows" of the browser 138. This is possible in the case where the broadcast is in format known as a "Webcast." It should be noted, that the present invention can be worked with other arrangements that may become possible as digital broadcasting matures.

Most radio and television broadcast systems use some type of time-synchronized transmission protocol. Therefore, in order to accurately associate audience reactions with broadcast segments, for example, video frames or spoken words, it is essential that the time difference among the clocks are exactly known.

Figure 6:
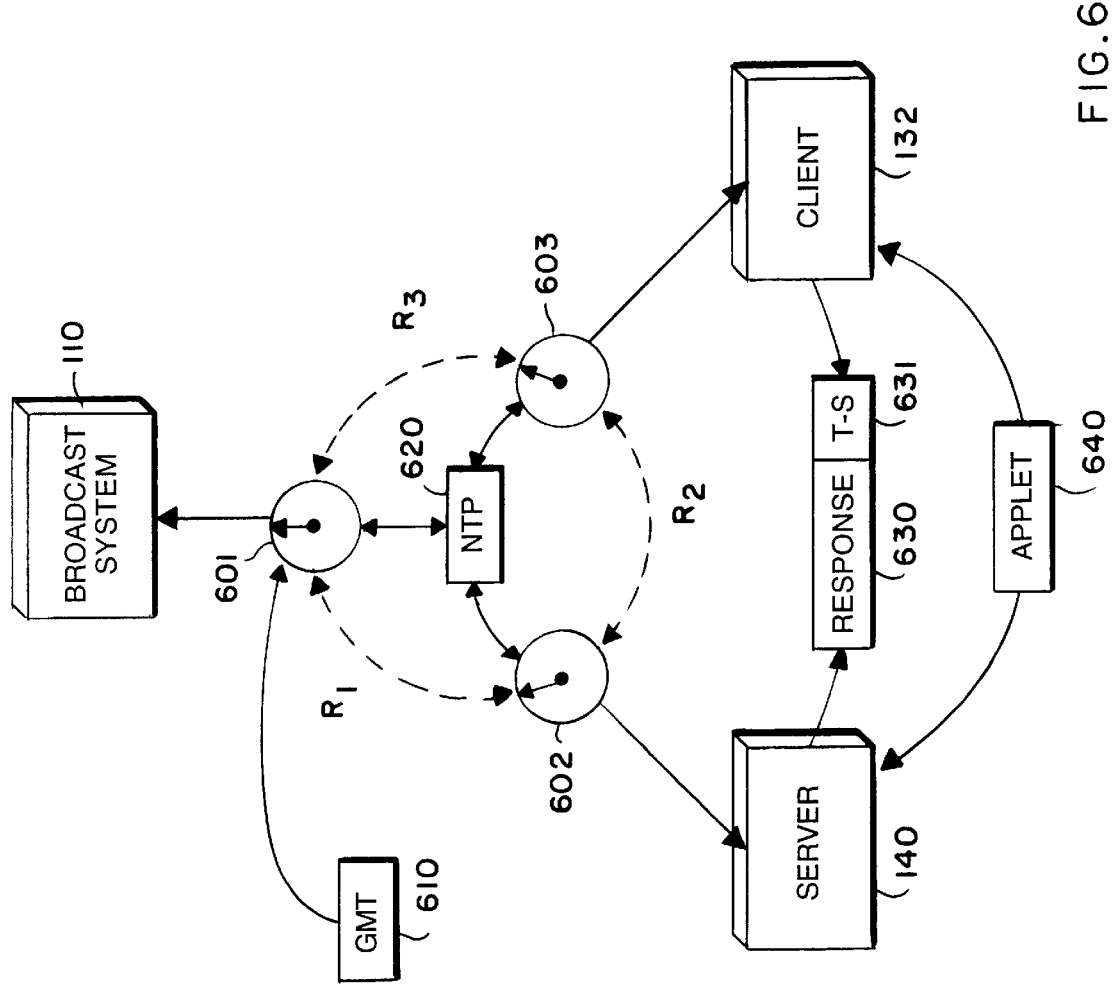
FIG. 6 is a block diagram of clocks to be synchronized.

As shown in FIG. 6, the three clocks are a broadcast clock 601, a server clock 602, and a client clock 603. The time difference between the clocks 601–603 are shown as $R_1$, $R_2$, and $R_3$. The broadcast clock 601 synchronizes broadcast events of the broadcast system 110. The broadcast clock 601 is synchronized to a known universal standard time 610, for example, GMT, and the broadcast segments occur at known constant time intervals, for example, video fields at a rate of fifty or sixty per second.

The server clock 602 synchronizes the operation of the server computer 140, and similar clocks can be used to synchronize the servers of the mirror sites. During operation of the server computer 140, the server clock 602 is also synchronized to a high precision with GMT using a standard network time protocol (NTP) 620, or other similar synchronization mechanisms. As a result, the value of the interval $R_1$ is substantially zero.

The client clock 603 maintains a constant, but initially unknown time. This means that the clock 603 experiences minimal drift, however, the time difference between the client clock 603 and the server clocks 602 is different by some arbitrary constant intervals $R_2$. For example, most casual computer users will invariably set their computer's "time" to whatever wall or wrist clock is available, many might just guess. At best, it might be within seconds of real-time, but more realistically it will likely be off by several minutes.

As another timing consideration, the minimum communications delay over the Internet 160 between the server and client computers is, in most cases, substantially the same in both directions, i.e. the delay is symmetric, provided that clients, servers, and the network circuits are equally loaded.

It should be noted, that the above clock differences are appropriate for terrestrial radio and television broadcasts. However, depending on the accuracy required, these relationships may or may not hold for broadcasts via a synchronously-orbiting satellite because round-trip delays to and from satellites are in the order of about a ¼ second. This means there may be up to a ¼-second spread between when terrestrial and satellite broadcast segments are respectively received. However, this spread may not be significant in applications where audience reactions are measured at intervals larger than the spread. It should also be noted, that if the broadcast is a Webcast, the members of the audience may use different network connections, therefore they may experience different delays.

However, if the clock difference $R_2$ is sufficiently well known for each audience member 130 and server 140, no matter where the server and member are geographically located in the world, then it becomes possible for the server 140 to synchronize audience interactions to the broadcast program segments by time-stamping each audience response 630 with a time-stamp (T-S) 631. The time-stamp 631 can be in terms of GMT 610, or the server's time.

Accordingly, each client computer 132 measures the difference between its client clock 603 and the server clock 602. This can be done by having the client 132 "download" an "applet" into the browser. Alternatively, the client 132 can communicate with an NTP server using the network timing protocol 620. As an advantage, the synchronization using an applet can be done without having to know if the client is running the NTP.

Figure 7:
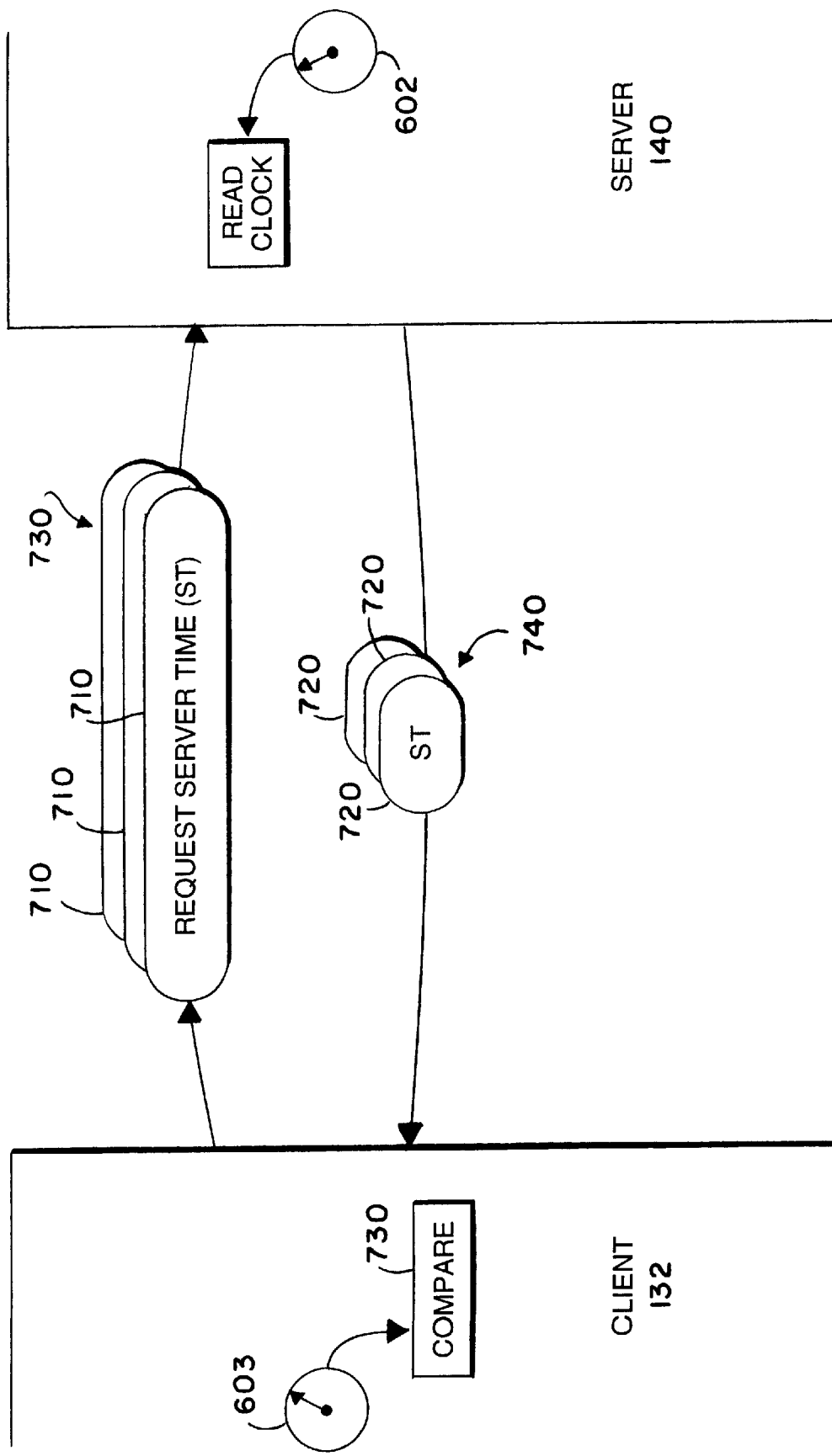
FIG. 7 is a flow diagram of a process for synchronizing a client clock with a server clock.

As shown in FIG. 7, a synchronization process 700 using either the NTP 620 or the applet 640 proceeds as follows. The client 132 repeatedly requests 710 the server 140 to read the server clock 602. In response to the requests 710, the server 140 replies the current server time (TS) 720 to the client 132.

Each server time 720, as soon as it is received, is compared 730 with the current time indicated by the client clock 603, i.e., the client time (CT). After a predetermined number of requests 710, half of the smallest difference between the time server (as communicated to the client) and the time at which the server's clock value arrives at the client, according to the client clock, is used as a best estimate of the interval $R_2$. The value $R_2$ can then be used to adjust the time of the client clock 603 to produce the time-stamps 631 of the responses 630 of FIG. 6, e.g., $$CT=ST+R_2.$$

It should be noted that the repeated time requests 710 and replies 720 between the client 132 and the server 140 can be conducted in a relatively short time during an initialization phase, and the requests and replies can easily be piggy-backed on other client-server communications traffic. In situations where the communication delay between the client the server does not matter, the client 132 and server 140 can "buffer" a larger number of requests 710 and replies as batches 730 and 740, thus requiring fewer larger packets and less network bandwidth.

It is important to realize that the invention does not require any modification of the client clock 603. After the interval $R_2$ has been established for a particular client, the client can just read the client clock 603 at any time, and adjust it by the value of $R_2$ to obtain the time expressed in terms of the server clock 602. As an advantage, the time-stamps 631 received by the server 140 from any client 132 are all expressed in server time, even if the audience is globally distributed. The size of the audience is limited only by bandwidth and server computing power limitations.

In summary, the invention provides means for gathering real-time reactions from large-scale audiences, perhaps distributed all over the world. The reactions can be gathered from audience members watching or listening to programs anywhere where the broadcast signal can reach and an Internet connection is available. The majority of the cost of conducting the interaction is borne by the audience members, provided they possess broadcast receivers and relatively simple home computers.

It is understood that the above-described embodiments are simply illustrative of the principles of the invention. Various other modifications and changes may be made by those skilled in the art which will embody the principles of the invention and fall within the spirit and scope thereof.

We claim:

1. A computerized method for collecting audience feed-back in response to a broadcast program in real-time, wherein the broadcast program is broadcast synchronized with a broadcast clock that is synchronized to a standard time, the method comprising:

at a server computer, while the broadcast program is being broadcast, transmitting a Web page to client computers of persons receiving the broadcast program; the transmitted Web page soliciting user feedback concerning the broadcast program; the server computer also maintaining a current server time value;

at the client computers, continuously maintaining a current client time value, receiving the transmitted Web page with a browser application, automatically downloading and executing an applet associated with the Web page so as to exchange messages with the server computer and generate a time differential between the client time value and the server time value; receiving via the browser application user input that includes the solicited user feedback concerning the broadcast program, generating user response messages based on the received user input, time-stamping the user response messages, and transmitting the time-stamped user response messages to the server computer; wherein each user response message includes a time stamp that indicates a server time value generated by a respective one of the client computers as function of the client time maintained by the respective client computer and the time differential generated by execution of the applet; and receiving from the client computers the time-stamped user response messages and analyzing the time-stamps of the received user response messages to associate such user response messages with specific segments of the broadcast program.

2. Apparatus for collecting audience feed-back in response to a broadcast program in real-time, wherein the broadcast program is broadcast synchronized with a broadcast clock that is synchronized to a standard time, the apparatus comprising:

a server computer, the server computer including:

means for maintaining a current server time value;

means for transmitting a Web page, while the broadcast program is being broadcast, the Web page being transmitted to client computers of persons receiving the broadcast program; the transmitted Web page soliciting user feedback concerning the broadcast program; the Web page having associated therewith an applet that when executed by any of the client computers sends messages to the server computer and generates a time differential between a client time value maintained by the client computer and the server time value;

means for receiving from the client computers time-stamped user response messages, the user response messages including the solicited user feedback concerning the broadcast program, each user response message including a time-stamp; wherein the time stamp in a received user response message indicates a server time value generated by the client computer as function of the client time maintained by the client computer which sent the user response message and the time differential generated by execution of the applet; and means for analyzing the time-stamps of the received user response messages to associate such user responses with specific segments of the broadcast program.

3. The apparatus of claim 2, wherein the server computer includes a server clock that is synchronized with the standard time; and means for responding to client computer messages requesting a server clock time value by returning a current server clock time value.

4. A computerized method for collecting audience feed-back in response to a broadcast program in real-time, wherein the broadcast program is broadcast synchronized with a broadcast clock that is synchronized to a standard time, the method comprising:

at a server computer, maintaining a current server time value;

at the server computer, while the broadcast program is being broadcast, transmitting a Web page to client computers of persons receiving the broadcast program; the transmitted Web page soliciting user feedback concerning the broadcast program; the Web page having associated therewith an applet that when executed by any of the client computers sends messages to the server computer and generates a time differential between a client time value maintained by the client computer and the server time value;

at the server computer, receiving from the client computers time-stamped user response messages, the user response messages including the solicited user feedback concerning the broadcast program, each user response message including a time-stamp; wherein the time stamp in a received user response message indicates a server time value generated by the client computer as function of the client time maintained by the client computer which sent the user response message and the time differential generated by execution of the applet; and at the server computer, analyzing the time-stamps of the received user response messages to associate such user responses with specific segments of the broadcast program.

5. The method of claim 4, further including synchronizing a server clock in the server computer with the standard time; and means for responding to client computer messages requesting a server clock time value by returning a current server clock time value.

* * * * *